NO PRINTED SPECIFICATION AVAILABLE
ELI KENDALL'S
Boarding Machine.
PATENTED June 10th 1856.
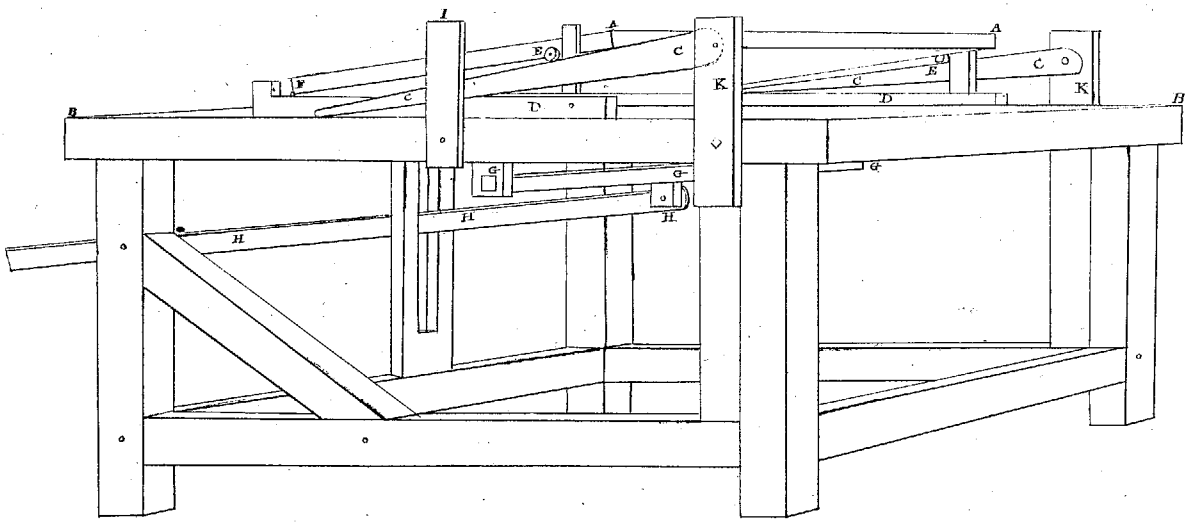
8911X June 19 1835

Eli Kendalls' Boarding machine
Letters Patent

8911X

The Schedule referred to in these Letters Patent and making part of the
same containing a description in the words of the said Eli Kendall him
self of his improvement in the mode of Boarding or softening skins by machin
ery called The "Boarding Machine for boarding or softening skins."

---

To all Persons to whom these Presents shall come
Eli Kendall of Ashby in the County of Middlesex and commonwealth of
Massachusetts Machinist sends greeting, Be it known that the said I Eli Kenda[ll]
have invented constructed made and applied to use a new and useful improve
ment in the mode of boarding or softening skins by Machinery called the "Board
ing Machine for boarding or softening skins," This improvement in boarding
or softening skins consists in the following particulars, By the old mode and
the one in fact that is generally in use, and the only one known to me the
said Eli, saving the Machine by me invented – in order to soften skins a
layer of cork is fastened to a piece of board, on the other side of the board
a leather strap is fastened; into which the hand is inserted and the boar[d]
is then rubbed with the cork side next to the skin over the skin back and
forth until the skin becomes sufficiently softened for use, this is a slow an[d]
laborious process. In the machine which I have invented the same work
is done in the following method which will be more fully understood
by a reference to the model or drawing accompanying this description.
The drawing represents a table B, B, whose top is six feet square accordin[g]
to the scale adopted in this drawing – supported by legs three feet high, up
on each side of the table B. B, are grooves in which the slides D, D, traver[se]
The slides D, D, support a frame A, A, which is loaded with the proper weig[ht]
and the under surface of the frame is covered with India rubber. This frame
is attached to the slides D, D, by a double iron hinge [illegible] at each lower corner
and is moved up the inclined plane C, C, upon rollers [illegible] by means of the
connecting crank H, H, which is attached to the slides by the frame [illegible],
the upright ends of which pass through the grooves and are morticed into the
slid[es]

8911X

[illegible] O.O. The mode or process of boarding or softening skins by this machine is as follows viz: a skin is doubled with its polished surface inwards and is held upon the table while the rubber frame moves up the inclined plane upon its rollers as far as K, where it rolls off and falls upon the skin and is then drawn backward to the end of the inclined plane where the motion is again repeated. By this process the skin whether morocco, kid, calf, or any other skin is speedily softened. The present machine will do the work of [illegible] men in the old way and may be worked either by water power, by steam, by horse power or by hand, in all of which ways its use has been contemplated by the said Eli. In testimony that the above is a true specification of my said improvement as above described I have hereunto set my hand and seal this fourth day of March (A.D.) 1835.

Witnesses

Wm J Hubbard
Joseph Willard

Eli Kendall (Drawing)

(628 [illegible])